J. WEED.
Tree and Plant Protector.
No. 36,742.
Patented Oct. 21, 1862.
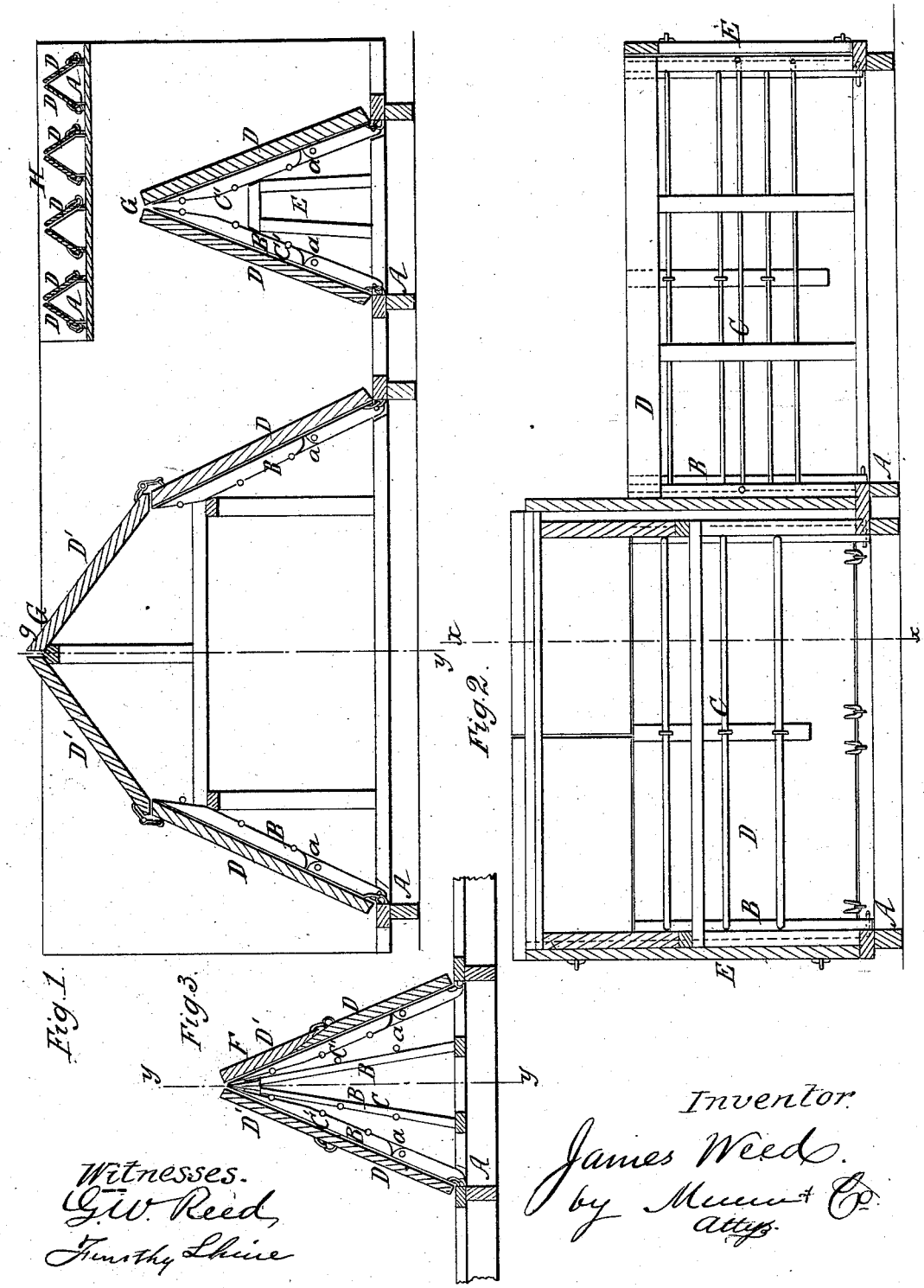

UNITED STATES PATENT OFFICE.

JAMES WEED, OF MUSCATINE, IOWA.

IMPROVED TREE AND PLANT PROTECTOR.

Specification forming part of Letters Patent No. 36,742, dated October 21, 1862.

*To all whom it may concern:*

Be it known that I, JAMES WEED, of Muscatine, in the county of Muscatine and State of Iowa, have invented a new Improved Tree and Plant Protector; and I do hereby declare that the following is a full, clear, and exact description of the same, reference being had to the accompanying drawings, forming a part of this specification, in which—

Figure 1 represents a transverse vertical section of a series of protectors of different size and construction, the plane of section being indicated by the line $x\,x$, Fig. 2. Fig. 2 is a longitudinal vertical section of the same, taken in the plane indicated by the line $y\,y$, Figs. 1 and 3. Fig. 3 is a similar section to Fig. 1 of a differently-constructed protector.

Similar letters of reference indicate corresponding parts in the several figures.

The object of this invention is to protect trees, vines, and other plants against injury from winter and spring frosts, and it embraces a system of protection which it is believed secures perfect immunity from these evils.

The invention consists in the employment or use of a compound trellis, ridge, and furrow system, substantially in the manner hereinafter described, for the purpose of protecting trees and other plants, and of training espaliers, &c.

It consists, further, in the application of simple and folding protectors or shutters, in combination with or without trellis-work, for the purpose of protecting trees or other plants.

To enable those skilled in the art to make and use my invention, I will proceed to describe its construction and operation, with reference to the drawings.

Fruit-growers, particularly in the United States, have to contend against climatic disadvantages, which arise principally from two causes. The first is an extremely-low temperature in winter, whereby trees, grape-vines, and other plants may be killed outright, or have their vitality impaired so as to destroy totally or partially the blossom-buds, thereby cutting short the fruit-crops of the following season; and sometimes it requires several years to restore the trees and other plants to their full vigor and fruitfulness after one such disastrous winter. The second disadvantage arises when mild winters occur and fruit-buds have escaped injury. The crop is not unfrequently destroyed by an untimely spring frost occurring when trees are in full bloom. In the northern and north-western States, for instance, the thermometer indicates frequently twelve or more degrees below zero, and it is well known that by this degree of cold the blossom-buds of the peach, apricot, nectarine, and many varieties of cherry and plum trees are generally killed, and many of the more hardy fruits are frequently so injured as to cause them to fall prematurely after blooming; and in the middle and southern States, where the winters are mild, the warm weather of spring occurs earlier in the season, and the period of blooming is consequently advanced; but if a cold "norther" sweeps down over the length and breadth of the land the unfortunate cultivator is unable to stay its ravages, and must solace himself with the hope of better luck in future seasons. These disadvantages are obviated by my invention, which is carried out in the following manner:

Take stout cedar or other posts, sink them level with the ground in two rows equidistant and opposite to each other. Thereon lay a sill or frame-work, A, about four feet two inches (more or less) from outside to outside. The two inches are allowed for a ridge-board. Then take rafters B, twelve (12) feet long and two by three and a half inches thick, or of any other desirable length and thickness according to the size of the plants to be protected, and place them on the frame-work A at an angle of about eighty-five degrees and six feet apart, and extend to such a length as space and desire may dictate. When the rafters B are fixed take galvanized iron wire and run it horizontally about six inches apart, strain thoroughly, and fasten each rafter with small staples, or in any other convenient manner. In this way a simple span-trellis, C, Fig. 3, is constructed, which will serve for training trees as espaliers. In order to protect the trees against the ravages of ice and cold, the trellis C may be covered over with shutters D, and doors E are fitted on one or both ends to give access to the plants. By placing two or more of these simple span-trellises side by side at suitable intervals, and extending them to any length to secure an economical proportion in the length and breadth of the land occupied, and by attaching them firmly to each other at the top by means of suitable cross bars or ties, I secure two highly important advantages: first, material support against high winds, rendering few or no posts in the ground necessary; and second, when the shutters are closed in winter, by filling the intervening spaces between the trellises with straw, leaves, or other similar substances, and placing the same over the ground outside and completely around the inclosure, winter frost may be effectually prevented from penetrating through the soil underneath.

The protectors which I use may be adapted to different kinds of trees and plants, and to different climates, as will be presently more fully explained.

For vines and trees and plants that require but little or no ventilation simple protectors, such as described, will answer the purpose, the doors at the ends being sufficient; but in climates subject to heavy snows, which might prevent opening such protectors to afford sufficient ventilation for the peach and other trees, which, under existing circumstances, might require more circulation of air than could be given in long ranges at the ends, the double or folding protectors shown at F would secure at all times the ventilation required. This protector is provided with a fixed trellis, C, in the center, and movable trellises C' are arranged on its outside, susceptible of being detached and thrown over into winter position, and the shutters D, which are hinged at the bottom to the frame-work A, are made with a hinged section, D', so that they can be turned back either wholly or partially, and as often closed as any danger of frost occurs, and when all such danger is past the shutters are folded back and fastened in their summer position, and the movable trellises C', with their trees, are turned back over the shutters and secured in their fruiting position.

The movable trellises may be made in two or more sections, united by joints a, to obviate the necessity of an abrupt bend in the trees at or near the surface of the ground in turning them from their summer to their winter position, and vice versa.

If the fixed trellis is removed, the protector assumes a construction as shown at G, and it is now fit to protect a row of pyramid trees and two rows of espaliers, and by increasing its dimensions it becomes applicable to standard trees.

For small plants in rows, such as strawberries, protectors H, of narrow dimensions, are applicable, which consist simply of two shutters, D, made to fold up, as clearly shown in Fig. 1 of the drawings.

The protectors may be made of any material best adapted to the purpose, as of wood, tin, iron, straw, &c., and constructed after any of the well-known methods of making non-conducting walls.

Having thus fully described my invention, what I claim as new, and desire to secure by Letters Patent, is—

1. The compound trellis C C', arranged substantially as and for the purpose shown and described.

2. The arrangement of the simple and folding shutters D D', in combination with or without the trellis C, as and for the purpose specified.

JAMES WEED.

Witnesses:
L. H. WASHTENEM,
THOMAS HANNA.